United States Patent
Plaskove et al.

(10) Patent No.: US 8,358,030 B2
(45) Date of Patent: Jan. 22, 2013

(54) WIND TURBINE APPARATUS

(75) Inventors: Robert M. Plaskove, Huntington, NY (US); Courtlandt G. Miller, Palm Beach, FL (US); Hamid Hefazi, Newport Coast, CA (US); Hamid R. Rahai, Long Beach, CA (US)

(73) Assignee: Via Verde Limited, Dunleer (IE)

( * ) Notice: Subject to any disclaimer, the term of this patent is extended or adjusted under 35 U.S.C. 154(b) by 0 days.

(21) Appl. No.: 13/353,998

(22) Filed: Jan. 19, 2012

(65) Prior Publication Data

US 2012/0235418 A1    Sep. 20, 2012

Related U.S. Application Data

(60) Provisional application No. 61/453,811, filed on Mar. 17, 2011.

(51) Int. Cl.
F03D 9/00         (2006.01)
(52) U.S. Cl. .......................................... 290/55; 290/54
(58) Field of Classification Search .................... 290/43, 290/44, 54, 55; 414/4.2
See application file for complete search history.

(56) References Cited

U.S. PATENT DOCUMENTS

| | | |
|---|---|---|
| 3,944,840 A | 3/1976 | Troll |
| 3,995,170 A | 11/1976 | Graybill |
| 4,017,204 A | 4/1977 | Sellman |
| 4,037,983 A | 7/1977 | Poeta |
| 4,070,131 A | 1/1978 | Yen |
| 4,097,190 A | 6/1978 | White |
| 4,104,006 A | 8/1978 | Meiri |
| 4,134,707 A | 1/1979 | Ewers |
| 4,134,708 A | 1/1979 | Brauser et al. |
| 4,154,556 A | 5/1979 | Webster |
| 4,156,580 A | 5/1979 | Pohl |
| 4,164,382 A | 8/1979 | Mysels |
| 4,186,314 A | 1/1980 | Diggs |
| 4,204,795 A | 5/1980 | Forrest |
| 4,213,057 A | 7/1980 | Are |
| 4,228,363 A | 10/1980 | Jacobs et al. |
| 4,237,384 A | 12/1980 | Kennon |
| 4,285,481 A | 8/1981 | Biscomb |
| 4,289,444 A | 9/1981 | Monk et al. |

(Continued)

FOREIGN PATENT DOCUMENTS

| | | |
|---|---|---|
| RU | 2006664 C1 | 1/1994 |
| RU | 2008515 C1 | 2/1994 |

(Continued)

OTHER PUBLICATIONS

International Search Report mailed by World Intellectual Property Organization on Jun. 28, 2012 in International Application No. PCT/US2012/029007 filed Mar. 14, 2012, 6 pages.

*Primary Examiner* — Nicholas Ponomarenko
(74) *Attorney, Agent, or Firm* — Pearne & Gordon LLP

(57) ABSTRACT

A wind turbine apparatus including a shaft, two wind turbines, and a two-piece alternator. The turbines and the alternator are mounted on the shaft. The alternator is located between the turbines. The alternator includes a circular permanent magnet component fixed to the first turbine, and a circular electrical winding component fixed to the second turbine so that, when an effective wind blows in a direction perpendicular to the longitudinal axis of the shaft, the first turbine and the circular magnet component will rotate around the shaft in a first direction and the second turbine and the circular winding component will rotate around the shaft in a second direction opposite the first direction, thereby generating electrical energy.

12 Claims, 5 Drawing Sheets

U.S. PATENT DOCUMENTS

| | | |
|---|---|---|
| 4,309,006 A | 1/1982 | Biscomb |
| 4,309,146 A | 1/1982 | Hein et al. |
| 4,313,710 A | 2/1982 | La Ferte |
| 4,321,005 A | 3/1982 | Black |
| 4,342,539 A | 8/1982 | Potter |
| 4,357,130 A | 11/1982 | Forrest |
| 4,382,190 A | 5/1983 | Jacobson |
| 4,414,477 A | 11/1983 | Mewburn-Crook et al. |
| 4,421,452 A | 12/1983 | Rougemont |
| 4,450,364 A | 5/1984 | Benoit |
| 4,474,529 A * | 10/1984 | Kinsey .................... 415/4.2 |
| 4,571,152 A | 2/1986 | Tatar |
| 4,606,697 A | 8/1986 | Appel |
| 4,619,585 A | 10/1986 | Storm |
| 4,648,819 A | 3/1987 | Sakamaki et al. |
| 4,652,206 A | 3/1987 | Yeoman |
| 4,674,954 A | 6/1987 | Kenfield |
| 4,725,194 A | 2/1988 | Bartsch |
| 4,730,119 A | 3/1988 | Biscomb |
| 4,784,568 A | 11/1988 | Benesh |
| 4,789,297 A | 12/1988 | Mrasek |
| 4,830,570 A | 5/1989 | Benesh |
| 4,834,610 A | 5/1989 | Bond |
| 4,850,792 A | 7/1989 | Yeoman |
| 4,850,910 A | 7/1989 | Higby et al. |
| 4,963,761 A | 10/1990 | Wight |
| 4,979,871 A | 12/1990 | Reiner |
| 5,044,878 A | 9/1991 | Wilhelm |
| 5,076,759 A | 12/1991 | Schonell |
| 5,080,553 A | 1/1992 | Armel |
| 5,083,899 A | 1/1992 | Koch |
| 5,126,584 A | 6/1992 | Ouellet |
| 5,131,805 A | 7/1992 | Stevenson |
| 5,137,416 A | 8/1992 | Mohrman |
| 5,163,813 A | 11/1992 | Schlenker |
| 5,183,386 A | 2/1993 | Feldman et al. |
| 5,195,871 A | 3/1993 | Hsech-Pen |
| 5,213,470 A | 5/1993 | Lundquist |
| 5,226,806 A | 7/1993 | Lubbers |
| 5,244,346 A | 9/1993 | Fergusson |
| 5,269,647 A | 12/1993 | Moser |
| 5,272,378 A | 12/1993 | Wither |
| 5,289,042 A | 2/1994 | Lis |
| 5,302,084 A | 4/1994 | Nelson |
| 5,313,103 A | 5/1994 | Hickey |
| 5,332,354 A | 7/1994 | Lamont |
| 5,336,933 A | 8/1994 | Ernster |
| 5,350,273 A | 9/1994 | Hector et al. |
| 5,375,968 A | 12/1994 | Kollitz et al. |
| 5,447,412 A | 9/1995 | Lamont |
| 5,454,694 A | 10/1995 | O'Dell |
| 5,478,197 A | 12/1995 | Schatz et al. |
| 5,484,257 A | 1/1996 | Osborn |
| 5,506,453 A * | 4/1996 | McCombs .................... 290/44 |
| 5,544,560 A | 8/1996 | Biasini |
| 5,553,996 A | 9/1996 | Farrar |
| 5,664,418 A | 9/1997 | Walters |
| 5,709,419 A | 1/1998 | Roskey |
| 5,746,576 A | 5/1998 | Bayly |
| 5,844,324 A | 12/1998 | Spriggle |
| 5,852,331 A | 12/1998 | Giorgini |
| 5,855,470 A | 1/1999 | Holmes |
| 5,910,688 A | 6/1999 | Li |
| 5,918,835 A | 7/1999 | Gerhardt |
| 5,921,745 A | 7/1999 | Round et al. |
| 6,000,907 A | 12/1999 | Bic |
| 6,015,258 A | 1/2000 | Taylor |
| 6,016,014 A | 1/2000 | Grigorescu et al. |
| 6,097,104 A | 8/2000 | Russell |
| 6,109,863 A | 8/2000 | Milliken |
| 6,113,350 A | 9/2000 | Lin |
| 6,127,739 A * | 10/2000 | Appa .................... 290/55 |
| 6,158,953 A | 12/2000 | Lamont |
| 6,179,563 B1 | 1/2001 | Minchey |
| 6,239,506 B1 | 5/2001 | Roskey |
| 6,249,058 B1 | 6/2001 | Rea |
| 6,278,197 B1 * | 8/2001 | Appa .................... 290/55 |
| 6,357,549 B1 | 3/2002 | Brennan et al. |
| 6,360,534 B1 | 3/2002 | Denniss |
| 6,363,718 B1 | 4/2002 | Shu |
| 6,413,038 B1 | 7/2002 | Lord |
| 6,465,899 B2 | 10/2002 | Roberts |
| 6,476,513 B1 * | 11/2002 | Gueorguiev .................... 290/55 |
| 6,481,957 B1 | 11/2002 | Brill |
| 6,492,743 B1 * | 12/2002 | Appa .................... 290/55 |
| 6,504,260 B1 | 1/2003 | Debleser |
| 6,518,680 B2 | 2/2003 | McDavid |
| 6,537,018 B2 | 3/2003 | Streetman |
| 6,602,045 B2 | 8/2003 | Hickey |
| 6,616,402 B2 | 9/2003 | Selsam |
| 6,626,636 B2 | 9/2003 | Bohn |
| 6,629,815 B2 | 10/2003 | Lusk |
| 6,638,005 B2 | 10/2003 | Holter et al. |
| 6,655,907 B2 | 12/2003 | Brock et al. |
| 6,666,650 B1 | 12/2003 | Themel |
| 6,682,296 B1 | 1/2004 | Jonsson et al. |
| 6,682,302 B2 | 1/2004 | Noble |
| 6,688,842 B2 | 2/2004 | Boatner |
| 6,740,989 B2 | 5/2004 | Rowe |
| 6,749,393 B2 | 6/2004 | Sosonkina |
| 6,749,394 B2 | 6/2004 | Boatner |
| 6,824,348 B2 | 11/2004 | Alexander et al. |
| 6,840,738 B1 | 1/2005 | Swanberg |
| 6,856,941 B2 | 2/2005 | Bradbury et al. |
| 6,857,846 B2 | 2/2005 | Miller |
| 6,872,045 B1 | 3/2005 | Weaver et al. |
| 6,884,020 B2 | 4/2005 | Kaare et al. |
| 6,887,031 B1 | 5/2005 | Tocher |
| 6,905,380 B1 | 6/2005 | Varga |
| 6,921,243 B2 | 7/2005 | Canini et al. |
| 6,929,450 B2 | 8/2005 | Noble |
| 6,939,101 B2 | 9/2005 | Yu et al. |
| 6,942,454 B2 | 9/2005 | Ohlmann |
| 6,945,747 B1 | 9/2005 | Miller |
| 6,948,905 B2 | 9/2005 | Horjus |
| 6,952,058 B2 | 10/2005 | McCoin |
| 6,955,521 B2 | 10/2005 | Yang |
| 6,957,946 B1 | 10/2005 | Vander Kley |
| 6,962,478 B2 | 11/2005 | Tsipov |
| 6,979,170 B2 | 12/2005 | Dery et al. |
| 6,984,899 B1 | 1/2006 | Rice |
| 7,008,171 B1 | 3/2006 | Whitworth |
| 7,040,858 B2 | 5/2006 | Suzuki |
| 7,040,859 B2 | 5/2006 | Kane |
| 7,056,082 B1 | 6/2006 | Taylor |
| 7,071,578 B1 | 7/2006 | Shibata et al. |
| 7,077,628 B1 | 7/2006 | Acord |
| 7,086,823 B2 | 8/2006 | Michaud |
| 7,086,824 B2 | 8/2006 | Yang |
| 7,094,017 B2 | 8/2006 | Kurita |
| 7,098,552 B2 | 8/2006 | McCoin |
| 7,112,034 B2 | 9/2006 | Bezemer |
| 7,116,006 B2 | 10/2006 | McCoin |
| 7,118,341 B2 | 10/2006 | Hartman |
| 7,153,090 B2 | 12/2006 | DeLeonardo et al. |
| 7,156,609 B2 | 1/2007 | Palley |
| 7,157,805 B2 | 1/2007 | Mooring |
| 7,186,083 B2 | 3/2007 | Bayly |
| 7,189,051 B1 | 3/2007 | Heifets |
| 7,199,486 B2 | 4/2007 | Roskey |
| 7,215,037 B2 | 5/2007 | Scalzi |
| 7,220,096 B2 | 5/2007 | Tocher |
| 7,220,107 B2 | 5/2007 | Kaneda |
| 7,227,276 B2 * | 6/2007 | Caiozza .................... 290/55 |
| 7,230,348 B2 | 6/2007 | Poole |
| 7,241,105 B1 | 7/2007 | Vanderhye et al. |
| 7,242,108 B1 | 7/2007 | Dablo |
| 7,245,042 B1 | 7/2007 | Simnacher |
| 7,258,527 B2 | 8/2007 | Shih |
| 7,276,808 B2 | 10/2007 | Weitkamp et al. |
| 7,284,949 B2 | 10/2007 | Haworth |
| 7,287,954 B2 | 10/2007 | Kinkaid et al. |
| 7,303,369 B2 | 12/2007 | Rowan et al. |
| 7,314,346 B2 | 1/2008 | Vanderhye et al. |
| 7,315,093 B2 | 1/2008 | Graham |
| 7,318,702 B2 | 1/2008 | Budi |
| 7,319,279 B2 | 1/2008 | Korner |

| | | | |
|---|---|---|---|
| 7,323,792 B2 | 1/2008 | Sohn | |
| 7,329,099 B2 | 2/2008 | Hartman | |
| 7,331,752 B2 | 2/2008 | Kiknadze et al. | |
| 7,344,353 B2 | 3/2008 | Naskali et al. | |
| 7,362,004 B2 * | 4/2008 | Becker | 290/55 |
| 7,364,399 B2 | 4/2008 | Stiig et al. | |
| 7,381,030 B1 | 6/2008 | Vanderhye | |
| 7,384,239 B2 | 6/2008 | Wacinski | |
| 7,393,177 B2 | 7/2008 | Rahai et al. | |
| 7,413,404 B2 | 8/2008 | Chio | |
| 7,427,173 B2 | 9/2008 | Chen | |
| 7,455,503 B2 | 11/2008 | Paish | |
| 7,467,923 B2 | 12/2008 | Rains | |
| 7,488,150 B2 | 2/2009 | Krippene | |
| 7,494,315 B2 | 2/2009 | Hart | |
| 7,517,198 B2 | 4/2009 | Baker et al. | |
| 7,518,257 B2 | 4/2009 | Guey et al. | |
| 7,547,984 B2 | 6/2009 | Fein et al. | |
| 7,569,963 B2 | 8/2009 | Caiozza | |
| 7,582,982 B1 * | 9/2009 | Deal | 290/55 |
| 7,586,209 B1 | 9/2009 | Lyatkher | |
| 7,597,532 B2 | 10/2009 | Gray et al. | |
| 7,614,852 B2 | 11/2009 | Clark | |
| 7,632,069 B2 | 12/2009 | Kelley | |
| 7,654,799 B2 | 2/2010 | Eyb | |
| 7,663,262 B2 | 2/2010 | Roskey | |
| 7,677,862 B2 | 3/2010 | Boatner | |
| 7,682,127 B2 | 3/2010 | Paul | |
| 7,713,020 B2 | 5/2010 | Davidson et al. | |
| 7,726,081 B1 | 6/2010 | Bennardo et al. | |
| 7,726,933 B2 | 6/2010 | Johnson | |
| 7,726,934 B2 | 6/2010 | Cowan | |
| 7,744,339 B2 | 6/2010 | Flores Lumbreras | |
| 7,744,345 B1 | 6/2010 | Pohribnak | |
| 7,753,644 B2 | 7/2010 | Krippene | |
| 7,758,299 B1 | 7/2010 | Jarecki | |
| 7,766,600 B1 | 8/2010 | Vanderhye | |
| 7,766,601 B2 | 8/2010 | Vida Marques | |
| 7,766,602 B1 | 8/2010 | Stroburg | |
| 7,771,158 B2 | 8/2010 | Grassi | |
| 7,780,411 B2 | 8/2010 | Yan | |
| 7,786,611 B1 | 8/2010 | Manaugh et al. | |
| 7,794,205 B1 | 9/2010 | Lowe-Wylde | |
| 7,798,766 B2 * | 9/2010 | Sauer | 415/4.2 |
| 7,802,967 B2 | 9/2010 | Krauss et al. | |
| 7,816,802 B2 | 10/2010 | Green | |
| 7,874,787 B2 | 1/2011 | Morris | |
| 7,883,318 B2 | 2/2011 | Voves | |
| 7,884,493 B2 | 2/2011 | Buskirk et al. | |
| 7,923,854 B1 * | 4/2011 | Meller | 290/55 |
| 8,026,626 B1 * | 9/2011 | Meller | 290/55 |
| 2004/0096327 A1 | 5/2004 | Appa et al. | |
| 2008/0023964 A1 | 1/2008 | Sureshan | |
| 2010/0111697 A1 | 5/2010 | Wood | |

FOREIGN PATENT DOCUMENTS

RU    2254667 C1    6/2005

\* cited by examiner

WIND TURBINE APPARATUS

This application claims the benefit of U.S. Provisional Application No. 61/453,811 filed on Mar. 17, 2011, the entire contents of which is incorporated herein by reference.

FIELD OF THE INVENTION

The invention relates to wind turbines and more particularly to a wind turbine apparatus for generating electrical power.

BACKGROUND OF THE INVENTION

Windmills and wind turbines have been long used for power generation. Many wind turbines in use today are mounted at the top of a high tower and have 3 long thin blades spinning in a vertical plane around a horizontal axis perpendicular to the plane. The tips of the blades travel at high speeds and create offending noise. Also, these units are so large that they can only be sited in wide-open spaces, usually far from where the power will be used. There is a need for a smaller, more compact wind turbine apparatus that does not cause noise from blade tips moving at high speeds, and which can be sited almost anywhere, particularly in congested urban areas, such as on top of buildings, on utility poles, on light posts, and on other existing urban structures, closer to where the power will be used.

SUMMARY OF THE INVENTION

A wind turbine apparatus comprising a shaft, a first wind turbine, a second wind turbine, and a two-piece alternator. The turbines and the alternator are mounted on the shaft. The alternator is located between the two turbines. The alternator comprises a circular magnet component fixed to the first turbine, and a circular winding component fixed to the second turbine so that, when an effective wind blows, the first turbine and the circular magnet component will rotate around the shaft in a first direction and the second turbine and the circular winding component will rotate around the shaft in a second direction opposite the first direction, thereby generating electrical energy.

DETAILED DESCRIPTION OF PREFERRED EMBODIMENTS OF THE INVENTION

When a range, such as 5-25, is given, this means preferably at least 5 and, separately and independently, preferably not more than 25.

Figure 1:
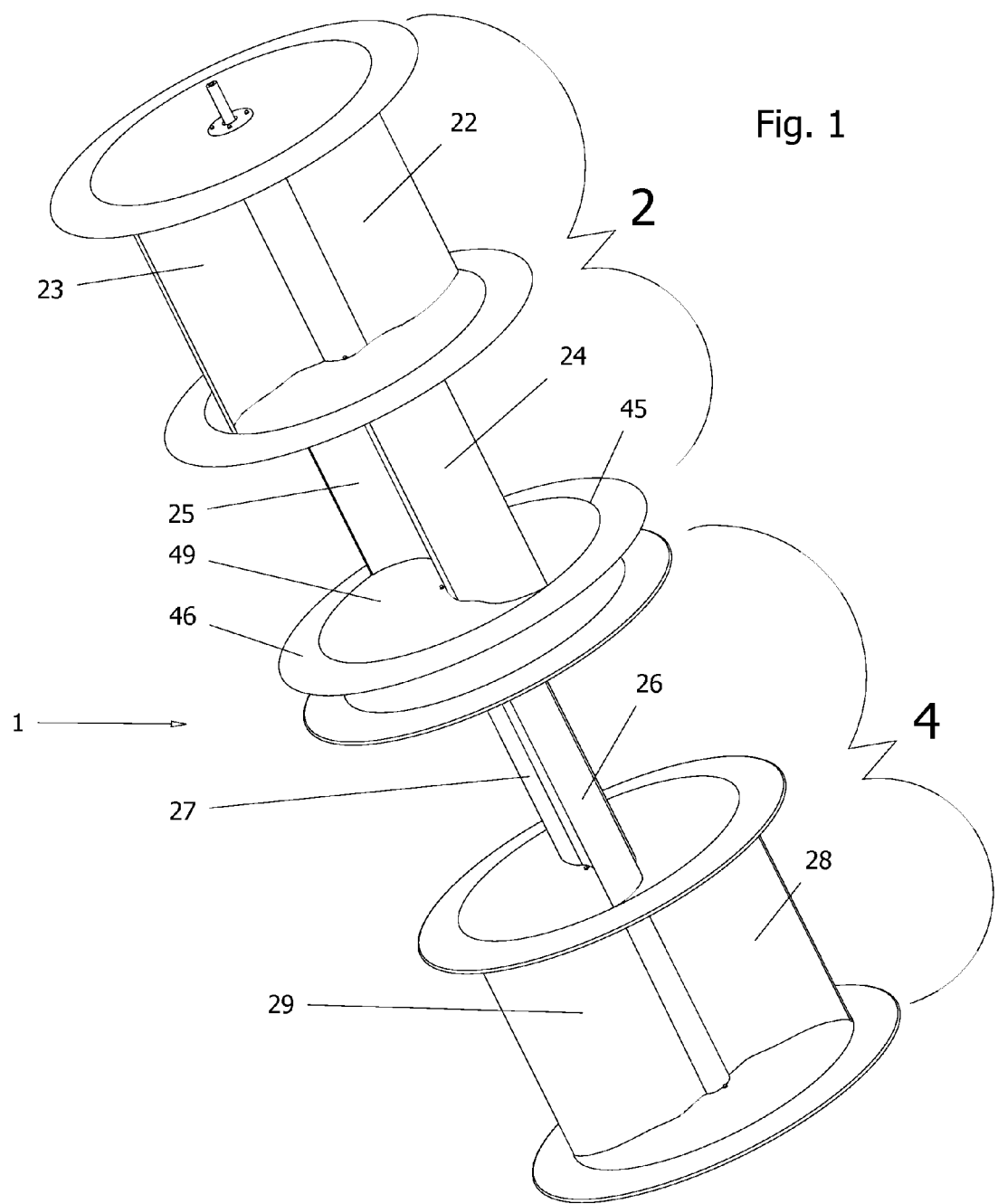
FIG. 1 is a perspective view of a wind turbine apparatus according to the invention.
Figure 2:
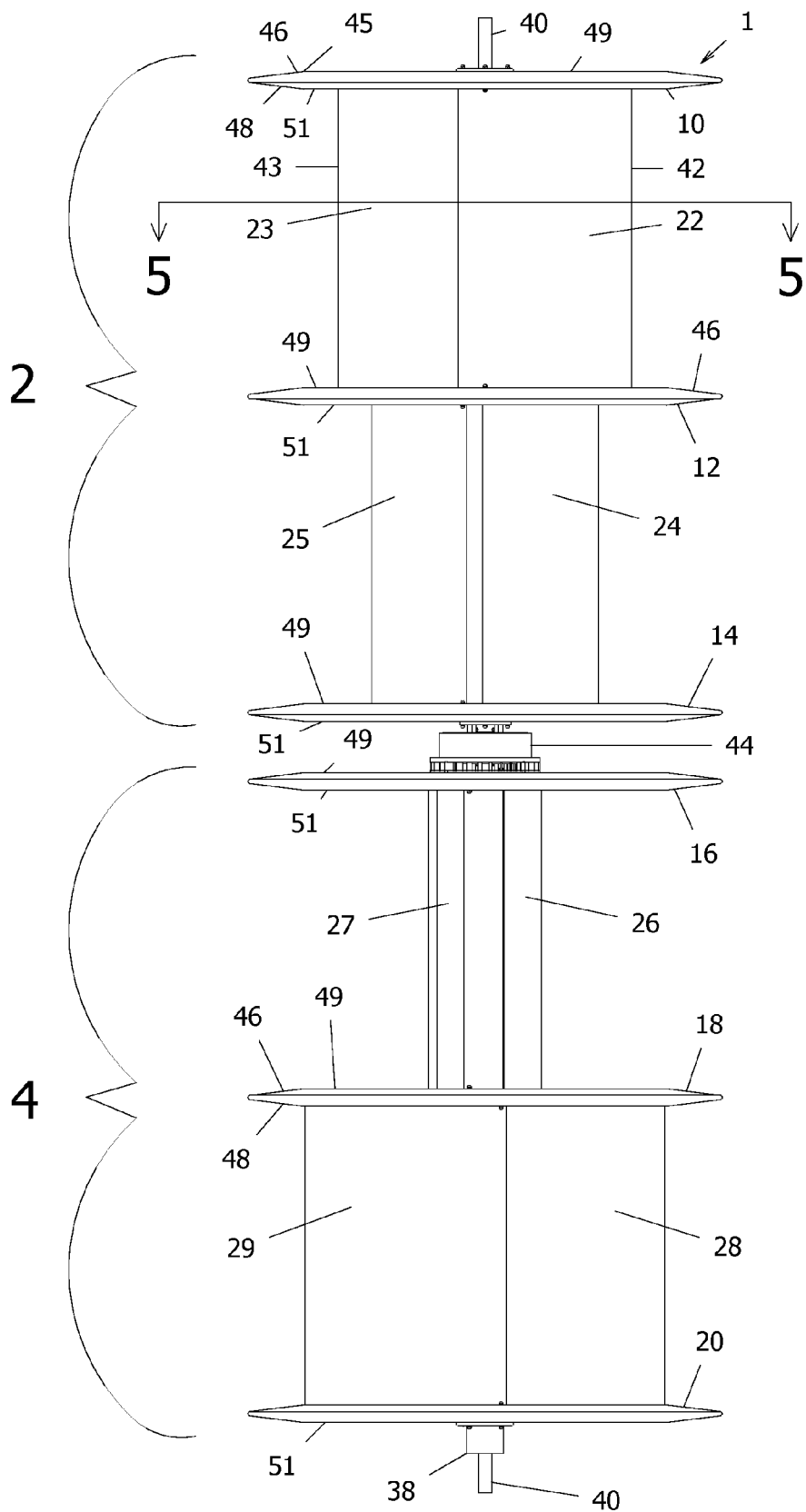
FIG. 2 is a front elevational view of the wind turbine apparatus of FIG. 1.

With reference to FIGS. 1 and 2, there is shown a wind turbine apparatus 1 according to the invention. This wind turbine apparatus can be referred to as a vertical axis wind turbine or as a Savonius-type wind turbine, although the shaft can be oriented vertically, horizontally, or anywhere in between. The wind turbine apparatus 1 includes a first or upper wind turbine 2, a second or lower wind turbine 4, and a 2-piece alternator 44 located between the upper and lower turbines. The two turbines and the alternator are mounted on a shaft 40. The upper turbine 2 includes an upper disc 10, a middle disc 12, and a lower disc 14. Between the upper disc 10 and the middle disc 12, there is located (a) a blade 22 having an outside vertical edge 42 and (b) a blade 23 having an outside vertical edge 43. In a similar manner, blades 24 and 25 are located between middle disc 12 and lower disc 14. The lower turbine 4, in a similar manner, has an upper disc 16, a middle disc 18, a lower disc 20, and blades 26, 27, 28, 29. As shown (see FIG. 5) each blade extends from a location adjacent the shaft 40 to a location further away from the shaft. As shown more clearly in FIG. 1, blades 22 and 23, together, define a first substantially S-shaped configuration centered on and extending through the shaft 40; blades 24 and 25, together, define a second substantially S-shaped configuration which is oriented substantially perpendicular to the first substantially S-shaped configuration of blades 22/23. The same arrangement of blades is shown for turbine 4. This is so that, regardless of the direction from which the wind blows, either combined blades 22/23 or combined blades 24/25 will be able to catch wind and rotate the upper turbine 2, and either combined blades 26/27 or combined blades 28/29 will be able to catch wind and rotate the lower turbine 4.

Between adjacent discs, for example, discs 10 and 12, 1, 2, 3 or more additional blades (shaped like blade 22 or 23) can be added so that, for example, there could be a blade every 30°, 45°, 60°, 90°, 120°, etc. (FIG. 1 shows blades 22 and 23 spaced 180° apart). Alternatively, in each turbine, 1, 2, 3, etc. additional discs can be added, with sets of blades between adjacent discs. Similar to how combined blades 22/23 is perpendicular to combined blades 24/25, adjacent combined blades (separated by a disc) can be perpendicular to each other, or at any angle between 0° and 90°, such as 30°, 45° or 60°. Less preferably, FIG. 2 can be reconfigured to eliminate discs 10 and 20 and blades 22, 23, 28, 29.

Optionally, additional turbines (such as turbine 2 or turbine 4) can be mounted on the same elongated fixed shaft (such as shaft 40) in an A-B-A-B-A-B etc. arrangement (A=clockwise; B=counterclockwise); an alternator 44 as described herein is located at every interface between an A turbine and a B turbine.

Figure 3:
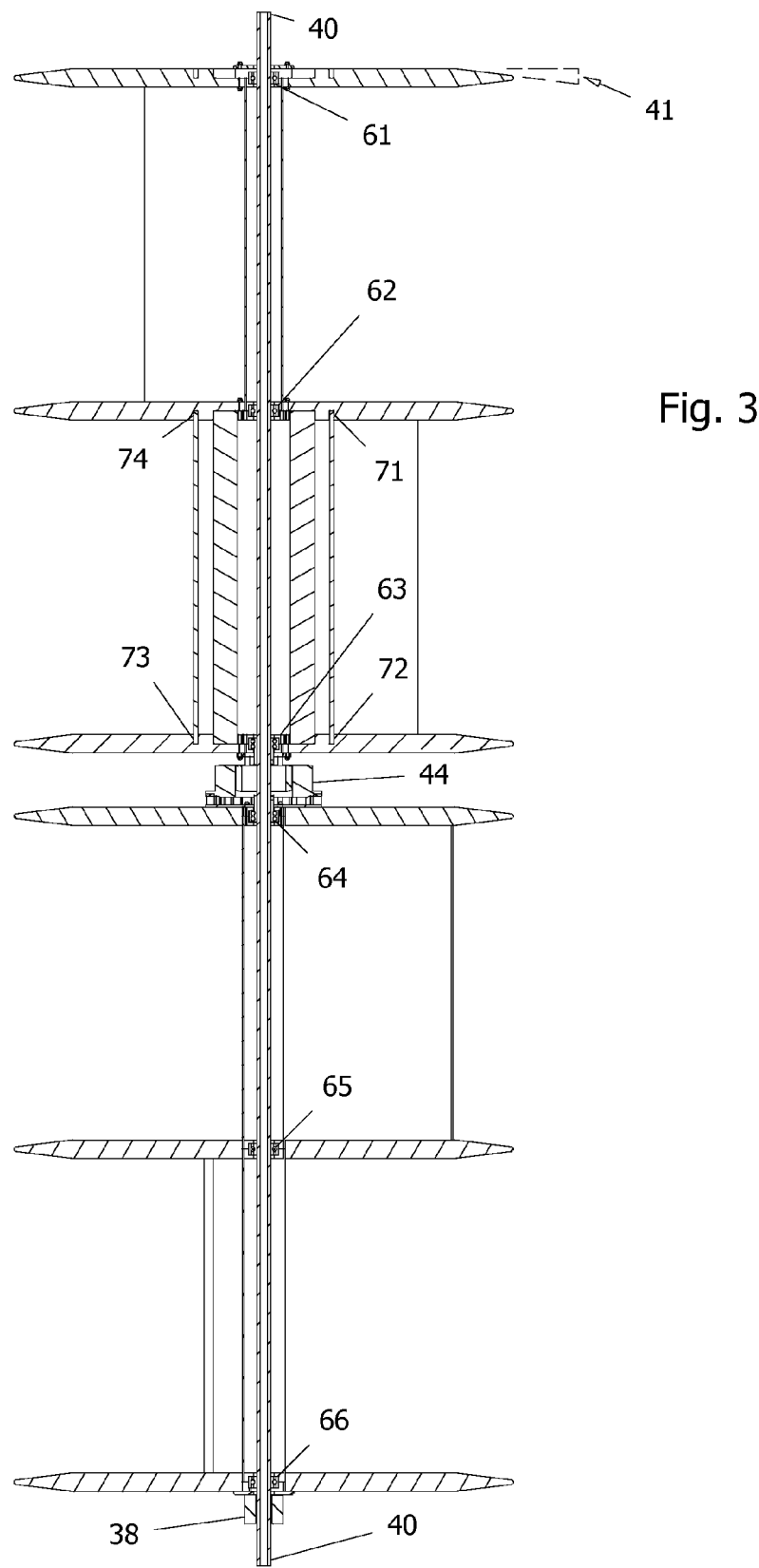
FIG. 3 is a front elevational cross-sectional view of the apparatus of FIG. 2 with the front half of the apparatus removed.
Figure 4:
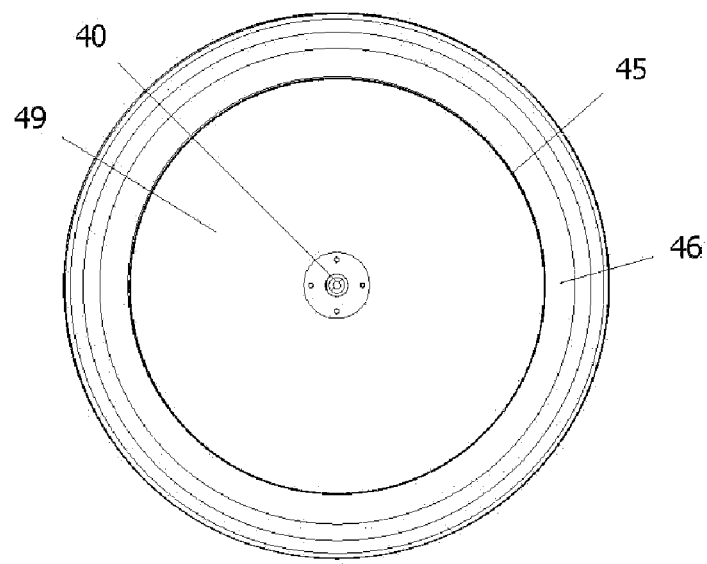
FIG. 4 is a top plan view of the apparatus of FIG. 2.

The six discs 10, 12, 14, 16, 18, 20 are substantially the same. Each disc is preferably 2-50 or 8-42 or 15-35 or 20-30 or about 25, mm in thickness between the flat central portions. As shown in FIGS. 2 and 4, each disc has a flat central portion 49 on its top side, a corresponding flat central portion 51 on the bottom side, an upper tapered peripheral portion 46 and a lower tapered peripheral portion 48; accordingly, each disc has a peripheral portion which is tapered. The lateral or horizontal distance from (a) where portions 46 and 49 meet (at boundary line 45) to (b) the outer edge of the disc where portions 46 and 48 meet, is preferably 1-13 or 2-10 or 2-8 or 2-5 or 3-8 or 3-5 or 4-7 or 5-10, cm. The amount of taper at the tapered edge of each disc 10, 12, 14, 16, 18, 20, such as shown at angle 41 in FIG. 3 between portion 49 and portion 46, is preferably 2°-14° or 4°-10° or about 6°-7°. The taper causes a Venturi effect upon the wind entering into the turbine, increasing its efficiency.

Figure 5:
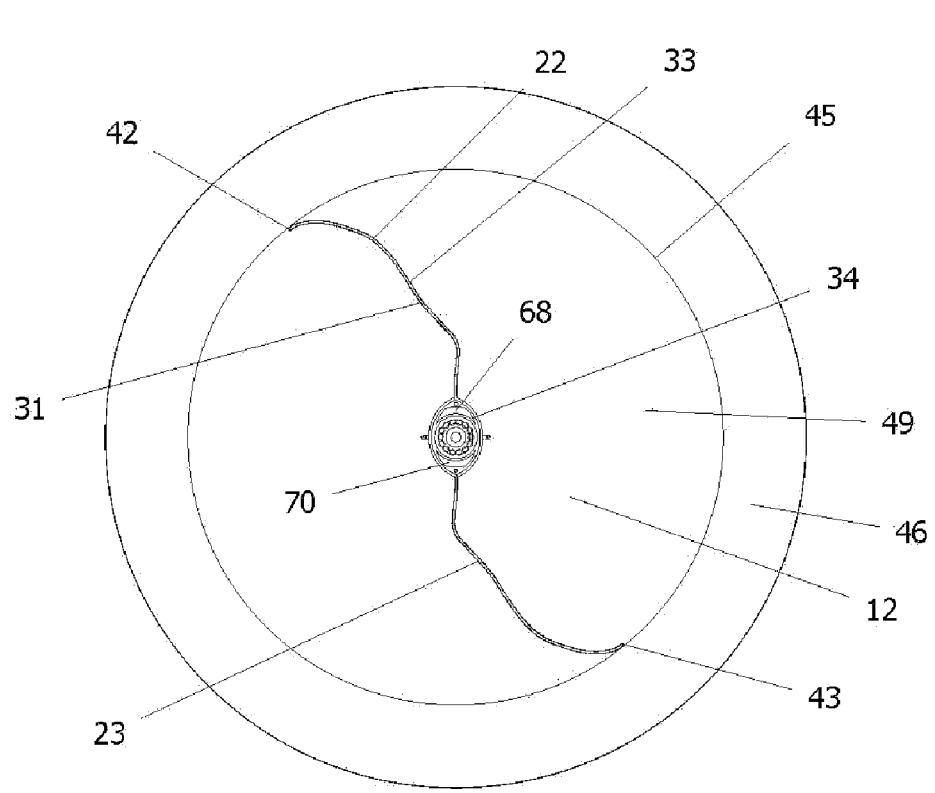
FIG. 5 is a cross-sectional view taken along line 5-5 of FIG. 2.

The blades 22, 23, 24, 25, 26, 27, 28, 29 are substantially the same. As shown in FIG. 5, blades 22 and 23 extend from a central ellipse portion 34 which surrounds the shaft 40. As shown in FIG. 5, each blade, such as blade 22, has a concave side 31 for catching the wind and a convex side 33. Preferred shapes for the concave side 31 are described in U.S. Pat. No. 7,393,177, the entire contents of which is incorporated herein by reference. As shown in FIG. 3, grooves, such as grooves 71, 72, 73, 74, are provided in the flat central portions 49, 51 of the discs so that the edges of the blades 22-29 can be slotted into the grooves and secured in place.

As shown in FIG. 2, the wind turbine apparatus 1 includes a fixed shaft 40 and a slip ring electromagnetic device 38. As shown in FIG. 3, bearings 61, 62, 63, 64, 65, 66 are provided to facilitate rotation of the upper and lower turbines 2, 4 around the shaft 40. As shown in FIG. 5, central ellipse portion 34 has a first wire conduit 68 and a second wire conduit 70 for the passage of electrical wires or conductors. Preferably, central ellipse portion 34 extends from the top of each turbine to the bottom. The wind turbine apparatus can be mounted with shaft 40 oriented vertically (see FIG. 2), horizontally or anywhere in between, such as at a 45° angle.

Figure 6:
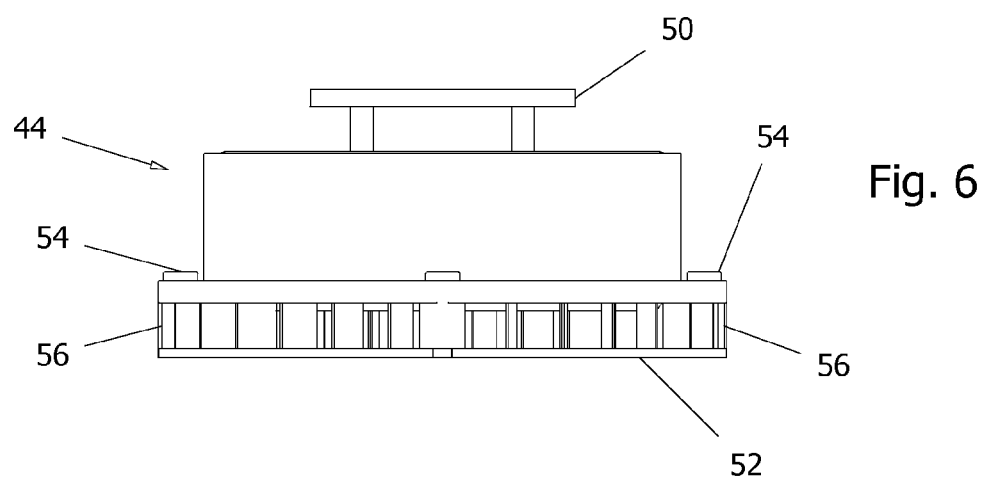
FIG. 6 is a front elevational view of the two piece alternator 44.
Figure 7:
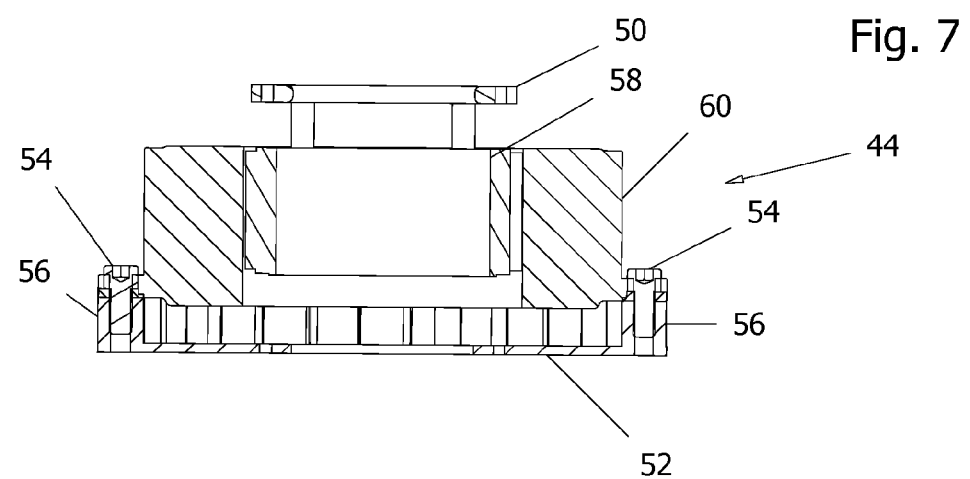
FIG. 7 is a front elevational cross-sectional view of the alternator of FIG. 6 with the front half removed.

With respect to FIGS. 6 and 7, the two piece low profile circular ring permanent magnet alternator 44 includes an upper metal plate 50 attached to the lower surface of disc 14 and a lower metal plate 52 attached to the upper surface of disc 16. The circular magnet component 58 (an array of permanent magnets) of the alternator is attached to the upper metal plate 50, while the circular winding component 60 (field coils or electrical windings) of the alternator is fixed via mounting bolts 54 extending through tubular metal standoffs 56 and through the lower metal plate 52 to the upper surface of disc 16.

An insulated wire (or wires) connects the electrical windings 60 to the slip ring 38 whereby the electrical output from the alternator is conveyed to the slip ring 38. The wire(s) preferably pass from the alternator through the conduits 68 and/or 70, to the slip ring 38. The electrical power output is then conveyed through electrical conductors and devices (as needed) to an electric power grid or other destination where it can be used.

The blades, discs and shaft are preferably made of aluminum, reinforced resin (carbon fiber, fiberglass, graphite, etc.), plastic composite or other lightweight, high strength material.

The diameter of each turbine, the diameter of each disc, and the straight-line distance from one edge (such as 43) of the S-shaped configuration to the other edge (such as 42) of the S-shaped configuration, is preferably 25-500 or 40-350 or 60-200 or 80-150 or 90-120 or about 100, cm. The height of each blade (from disc to disc) is preferably 35-700 or 50-550 or 60-400 or 70-300 or 80-200 or 90-150 or about 100, cm. The ratio of (a) the straight-line distance from one edge (such as 43) of the S-shaped configuration to the other edge (such as 42) of the S-shaped configuration to (b) the height of the S-shaped configuration (from disc to disc), is preferably 5 to 1 or 1 to 5 or 3 to 1 or 1 to 3 or 2 to 1 or 1 to 2 or 1.5 to 1 or 1 to 1.5 or 1.2 to 1 or 1 to 1.2 or about 1.

The invention is preferably mounted in a conventional manner, or as is known in the art, to the top of a street light, utility pole, telephone pole, traffic light pole, cell tower, antenna, water tower, building roof, satellite dish or tower, or other tall structure.

The wind turbine apparatus 1 functions in the following manner. As shown in FIG. 1, when an effective wind blows in a direction perpendicular to the shaft, the upper turbine 2 will rotate in a clockwise direction (when viewed from the top), while the lower turbine 4 will rotate in a counterclockwise direction (when viewed from the top). When the upper and lower turbines rotate in opposite directions, that is, counter-rotating, this will cause the magnet component 58 of the alternator (fixed to the upper turbine 2) to rotate in the opposite direction from the rotation direction of the winding component 60 (fixed to the lower turbine 4). As known in the art, this will generate electricity or electrical energy or power, which is carried via electrical wires or conductors as known in the art to an electrical power grid, battery, electric power storage device, or directly to an end use.

Although preferred embodiments of the invention have been described, it is contemplated that modifications thereof may be made and some features may be employed without others. All such variations are considered within the scope of this invention as defined by the appended claims.

What is claimed is:

1. A Savonius-type wind turbine apparatus comprising a shaft, a first wind turbine, a second wind turbine, and a two-piece alternator, the shaft having a longitudinal axis, the first wind turbine, the second wind turbine and the alternator being mounted on the shaft, the alternator being located between the first wind turbine and the second wind turbine, the alternator comprising (a) a circular magnet component fixed to the first wind turbine, and (b) a circular winding component fixed to the second wind turbine so that, when an effective wind blows in a direction perpendicular to the longitudinal axis of the shaft, (1) the first wind turbine and the circular magnet component will rotate around the shaft in a first direction and (2) the second wind turbine and the circular winding component will rotate around the shaft in a second direction opposite the first direction, thereby generating electrical energy, the wind turbine apparatus being further characterized in that the first turbine comprises a first disc, a second disc and at least two blades, the shaft extending through a center of each disc, each blade extending from the first disc to the second disc and from a location adjacent the shaft to a location further away from the shaft, the first turbine comprising a third disc, the shaft extending through a center of the third disc, the second disc being located between the first disc and the third disc, at least two blades extending from the second disc to the third disc and from a location adjacent the shaft to a location further away from the shaft, the two blades extending from the first disc to the second disc defining a first substantially S-shaped configuration, the two blades extending from the second disc to the third disc defining a second substantially S-shaped configuration which is oriented substantially perpendicular to the first substantially S-shaped configuration.

2. The apparatus of claim 1, the first wind turbine having a plurality of blades, each blade extending from a location adjacent the shaft to a location further away from the shaft; the second wind turbine having a plurality of blades, each blade extending from a location adjacent the shaft to a location further away from the shaft.

3. The apparatus of claim 1, the first wind turbine comprising a pair of blades which, together, define a substantially S-shaped configuration extending through the longitudinal axis.

4. The apparatus of claim 1, further comprising a third wind turbine mounted on the shaft, the second wind turbine being located between the first wind turbine and the third wind turbine, a second alternator being located between the second wind turbine and the third wind turbine, the second alternator comprising a first component fixed to the second wind turbine and a second component fixed to the third wind turbine so that, when the effective wind blows in a direction perpendicular to the longitudinal axis of the shaft, the third wind turbine will rotate around the shaft in the same direction that the first wind turbine rotates around the shaft.

5. The apparatus of claim 1, the first disc having a peripheral portion which is tapered.

6. The apparatus of claim 1, further comprising a first wire conduit extending (a) at least from the first disc to the second disc and (b) parallel to and adjacent to the shaft.

7. The apparatus of claim 3, wherein the straight-line distance from one edge of the S-shaped configuration to the other edge of the S-shaped configuration is 25-500 cm.

8. The apparatus of claim 1, wherein the distance from the first disc to the second disc is 35-700 cm.

9. The apparatus of claim 1, wherein at least one blade extends into a groove in the first disc and into a groove in the second disc.

10. The apparatus of claim 1, at least one of the blades located between the first and second discs having an outside edge (42), the first disc having an outer diameter periphery, said outer diameter periphery extending from the shaft a greater distance than said outside edge (42) extends from the shaft so that the outside edge (42) is inset with respect to the outer diameter periphery.

11. The apparatus of claim 10, the first disc having a bottom flat central portion (51) and a lower tapered peripheral portion (48), the bottom flat central portion (51) meeting the lower tapered peripheral portion (48) at a boundary line (45), the outside edge (42) terminating at the boundary line (45).

12. The apparatus of claim 1, wherein the ratio of (a) the straight-line distance from one edge (43) of the first substantially S-shaped configuration to the other edge (42) of the first substantially S-shaped configuration to (b) the height of the first substantially S-shaped configuration from disc to disc is between 1.5 to 1 and 1 to 1.5.

* * * * *